No. 890,957. PATENTED JUNE 16, 1908.
J. G. BLESSING.
CUTLERY GLAZING MACHINE.
APPLICATION FILED JULY 22, 1907.

3 SHEETS—SHEET 3.

Witnesses:

Inventor:
John G. Blessing,
By Dyrenforth, Lee, Chritton & Wiles,
Attys.

UNITED STATES PATENT OFFICE.

JOHN G. BLESSING, OF NEW BRITAIN, CONNECTICUT, ASSIGNOR TO AMERICAN CUTLERY COMPANY, OF CHICAGO, ILLINOIS, A CORPORATION OF ILLINOIS.

CUTLERY-GLAZING MACHINE.

No. 890,957.  Specification of Letters Patent.  Patented June 16, 1908.

Application filed July 22, 1907. Serial No. 384,874.

*To all whom it may concern:*

Be it known that I, JOHN G. BLESSING, a citizen of the United States, residing at New Britain, in the county of Hartford and State of Connecticut, have invented a new and useful Improvement in Cutlery-Glazing Machines, of which the following is a specification.

My invention relates particularly to improvements in the cutlery-glazing machine forming the subject of my pending application for Letters Patent, Serial Number 338,933, filed October 15, 1906; and my primary object is to provide improvements in the work-holder of such a machine to the end of better adapting it to its purpose.

Figure 1:
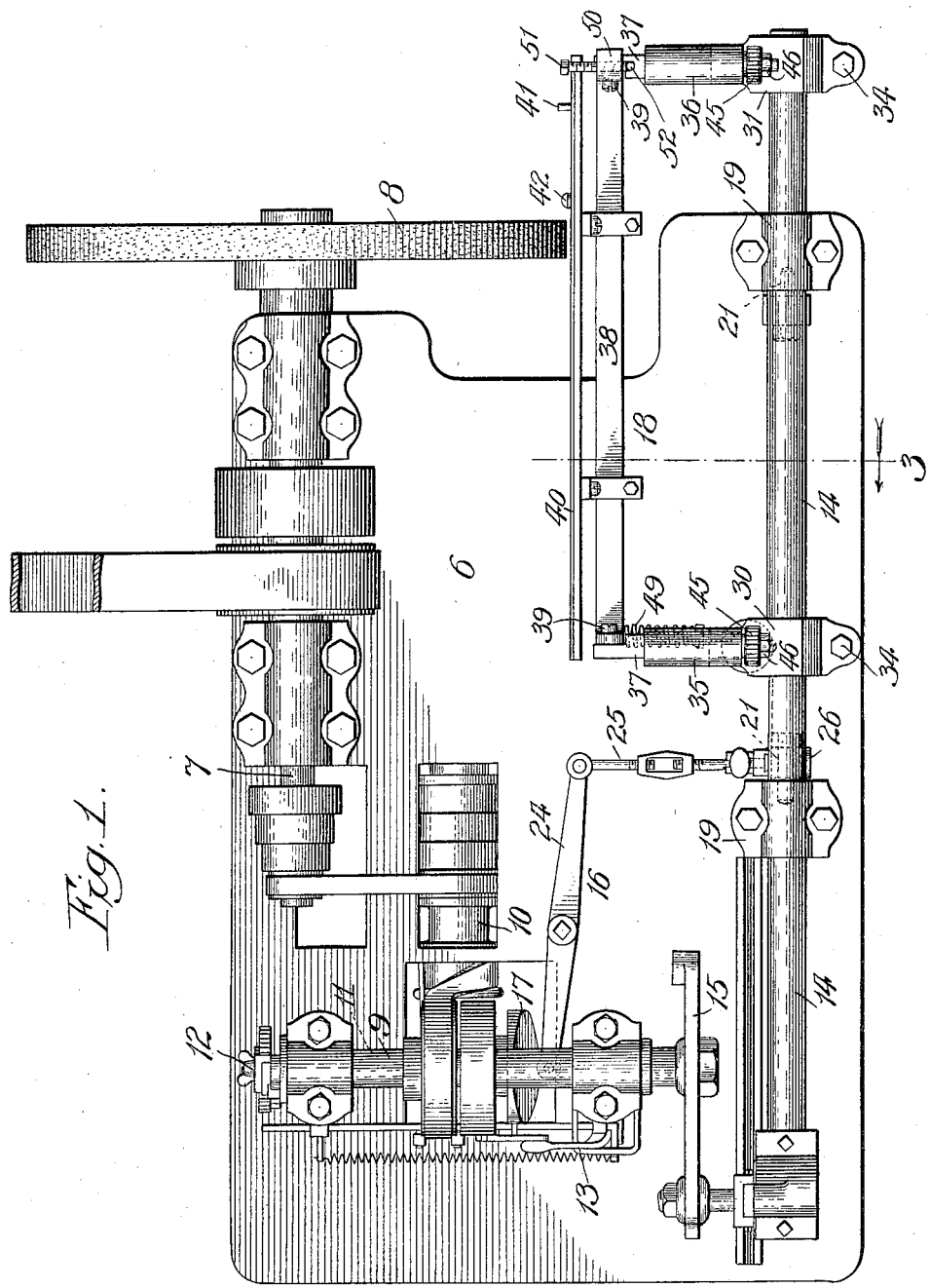
Figure 2:
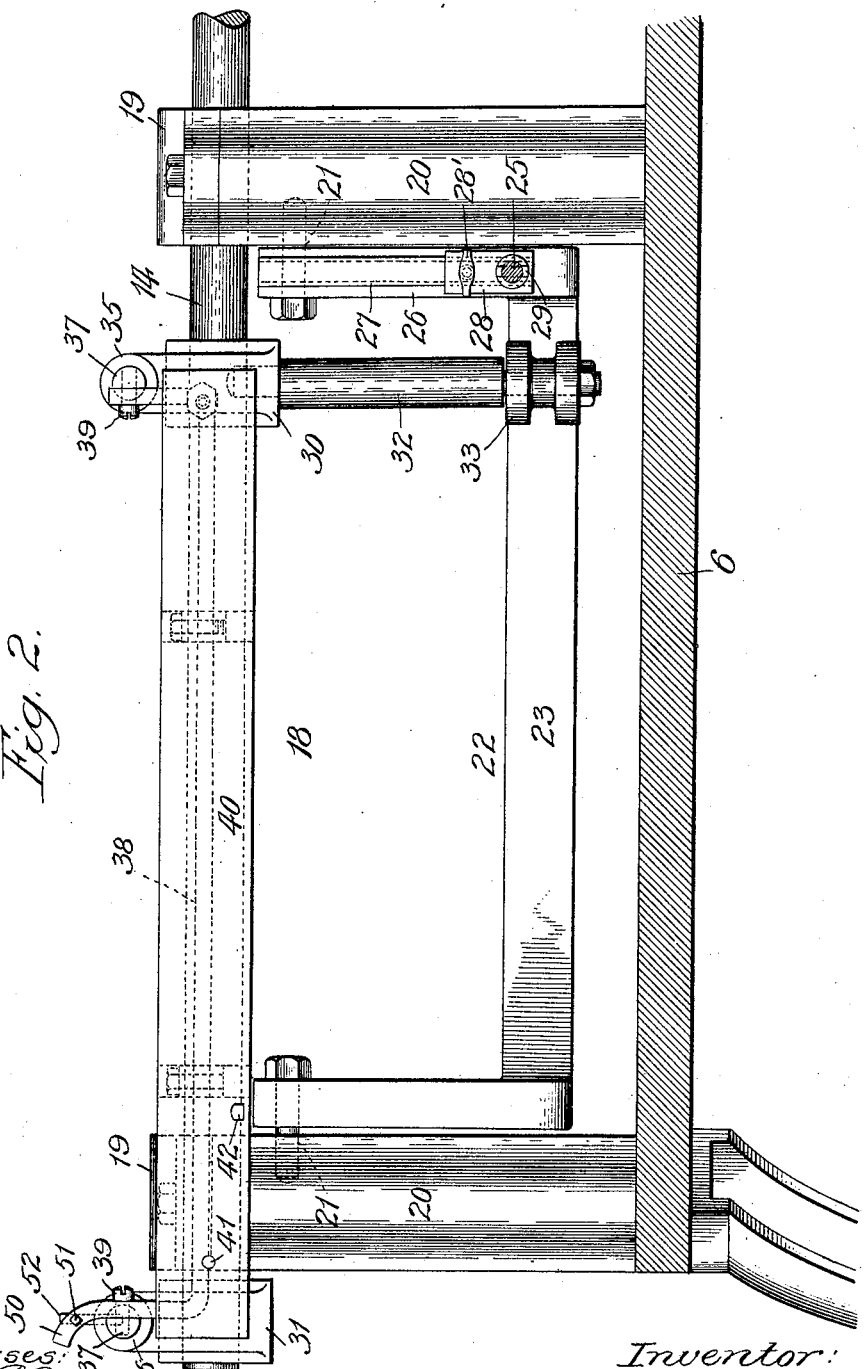
Figure 3:
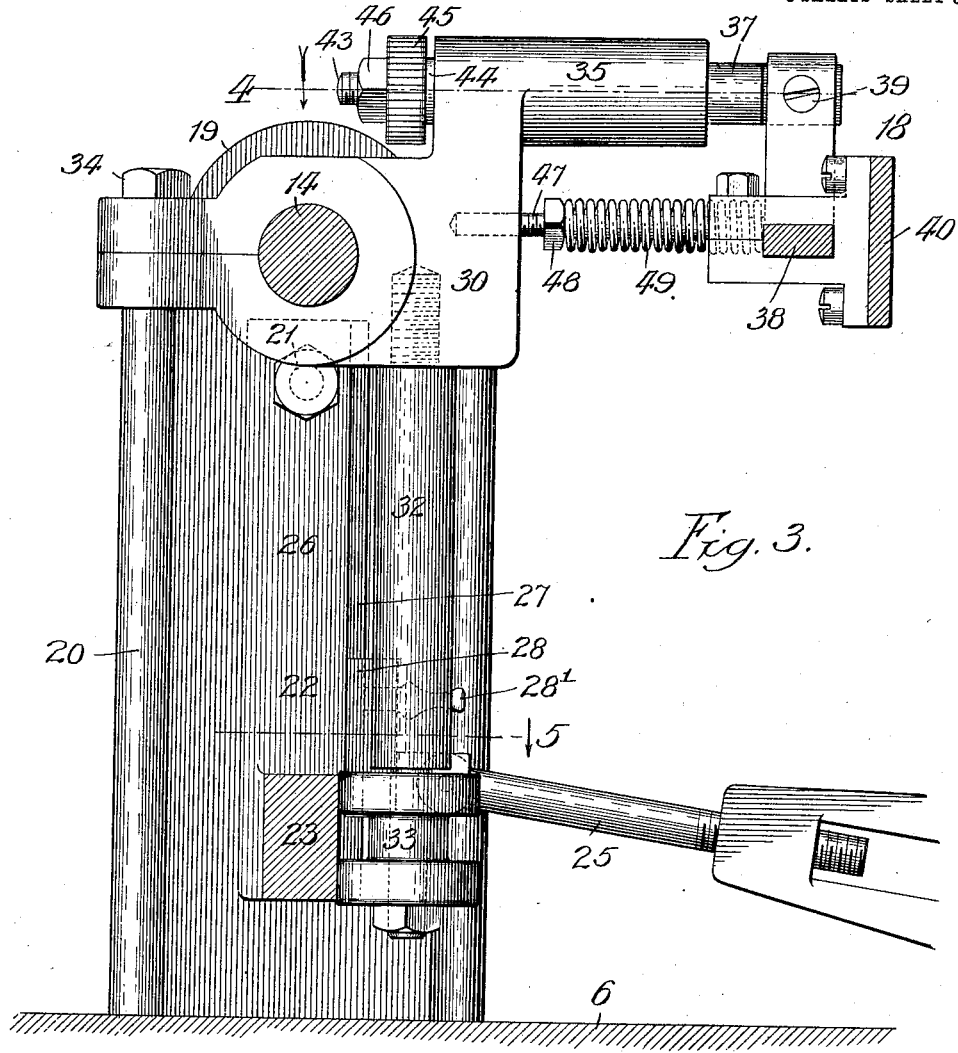
Figure 4:
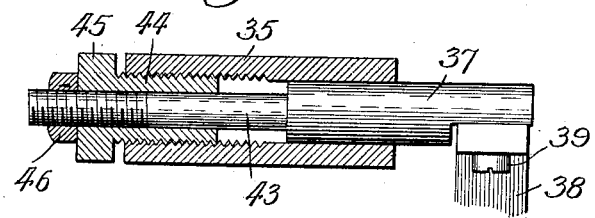
Figure 5:
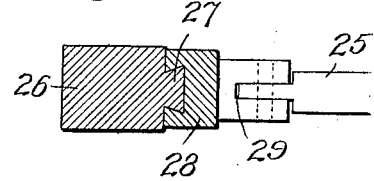

Referring to the accompanying drawings—Figure 1 is a plan view of a cutlery-glazing machine embodying my improvements; Fig. 2 is an enlarged broken face-view of the work holder, showing the bed of the machine in section; Fig. 3 is a section taken at the line 3 on Fig. 1, viewed in the direction of the arrow and enlarged; Fig. 4 is a section taken at the line 4 on Fig. 3 and viewed in the direction of the arrow, and Fig. 5, a section taken at the line 5 on Fig. 3 and viewed in the direction of the arrow.

The general construction of the machine illustrated is that shown and described in my pending application for Letters Patent hereinbefore referred to. It is therefore deemed unnecessary to describe in detail those parts of the machine illustrated in the accompanying drawings, which are identical with the machine of the above-mentioned pending application. It may be stated, however, that the machine comprises a bed 6 upon which is journaled a driven-shaft 7 carrying an abrading-wheel 8 and through which the power to the machine is supplied; a second driven-shaft 9 belted to the shaft 7 through the medium of a pulley-equipped shaft 10 below the bed of the machine; a third shaft, indicated at 11, journaled below the shaft 10 and intermittently operated by the shaft 10 through pawl and ratchet mechanism 12; mechanism 13 for starting the machine and automatically stopping the same at a predetermined time; a reciprocating shaft 14 actuated by the shaft 9 through the medium of a crank 15, and lever mechanism 16 actuated by a cam 17 on the shaft 11 to cause the work-holder 18 of the machine to be given an intermittent rocking movement. The operation of the machine reciprocates the work-holder past the grinding face of the abrading wheel, and at the same time intermittently rocks the work-holder to cause different portions of the surfaces of the work being operated on to bear against the wheel.

The shaft 14 reciprocates in bearings 19 provided on standards 20 rising from the bed 6, and pivotally supported near its upper end in the standards 20 as indicated at 21, 21 to depend between them, is a yoke 22 having a horizontal guide-bar 23. This guide-bar is connected with the lever-mechanism 16 which comprises a lever 24 fulcrumed near its center to the bed and bearing at one end against the cam 17; and a link 25 containing a turnbuckle and connected at its opposite ends with one end of the lever 24 and a side-bar 26 of the yoke. This side-bar has on its face a longitudinal dovetailed tongue 27 and slidingly confined on this tongue is a block 28 provided with a slot 29 at which the link 25 is connected with the yoke, a set-screw 28¹ being provided in the block to permit the latter to be fastened in any position of adjustment on the side-bar 26.

The work-holder 18 has two similar sleeve portions 30, 31 rigidly secured on the rod 14 as by bolts 34, and depending from the sleeve 30 is a rod 32 carrying a roller 33 which under due weight of the work-holder bears against the guide-bar 23. The sleeves have horizontal tubular rearward extensions 35, 36, respectively, in each of which is slidably mounted a rod 37 to the outer ends of which is pivotally secured a depending yoke 38, as by pivots 39. On the yoke 38 is adjustably secured a work-carrier plate 40 having the usual stud 41 and hook 42 for supporting a knife-blade (not shown) while being ground. Each rod 37 has a reduced portion 43 threaded at its rearwardly-projecting end and screwed into the rear end of each extensions 35, 36, to be adjustable therein, is a gland 44 surrounding the reduced end of the rod and provided with a knurled head, as indicated at 45, forming a stop for a nut 46 on the end of the plunger. Thus by adjusting a gland 44 and nut 46 the extent of protrusion of either rod 37 may be regulated independently of that of the other rod. A pin 47, screwed into the sleeve 35, carries an adjustable nut 48 and surrounding the pin 47 and extending beyond it, and bearing at one end against the nut 48, is a spiral spring 49 which presses at its other end against one corner of the yoke 38, as represented in Figs. 1 and 3, thereby holding this end of the work-carrier plate 40 in spring-pressed condition. The end of the yoke 38 adjacent to the extension 36 terminates in a curved extension 50 containing a set-screw 51 which, under the action of the spring 49, abuts at one end against the adjacent end of a vertical pin 52 carried by the rod 37 in the extension 36. Thus by adjusting the set-screw 51 the extent of tilting of the work-holder may be effected. Thus in the operation of the machine, by reason of the spring-pressed condition of the pivoted yoke carrying the work-holding plate, the work to be ground is sustained yieldingly against the abrading-wheel.

The adjustable features of the machine hereinbefore described enable the plate to be nicely adjusted relative to the abrading-wheel for suitably glazing knife-blades of different lengths, thicknesses and contour.

The rods 37, 36, have no movement during the operation of grinding a knife-blade or the like, and thus in their use serve merely as stationary arms sustaining the ends of the work-support. Therefore, obviously, the work-support may be attached to the extensions otherwise than through a rod.

What I claim as new and desire to secure by Letters Patent is—

1. In a cutlery-glazing machine, the combination of a rocking support, means for rocking said support, and a spring-pressed work-support pivoted to said rocking support and constructed and arranged to releasably hold work therein in a horizontal plane to one side of the horizontal plane in which the work-support is pivoted to said first-named support.

2. In a cutlery-glazing machine, the combination of a rocking support, means for rocking the support, arms pivoted to and depending from said support, and a spring-pressed work-supporting bar connected near the lower ends of said arms, for the purpose set forth.

3. In a cutlery-glazing machine, the combination of a rocking support, means for rocking said support, depending arms pivoted near their upper ends to said support in spaced relation, a work-supporting bar secured near the lower ends of said arms, and a spring confined between said bar and first-named support and operating normally to tilt said bar.

4. In a cutlery-glazing machine, a work-holder comprising a plurality of spaced supports, a work-support pivotally secured to said supports, a spring bearing against said work-support and tending normally to hold it in upwardly-tilted position, and means for limiting the upward tilting of the work-support.

5. In a cutlery-glazing machine, a work-holder comprising a plurality of adjustable supports, a work-support pivotally secured to said adjustable supports, a spring bearing against said work-support tending normally to hold it in upwardly-tilted position, and means on said work-support and on one of said adjustable supports for limiting the upward tilting of the work-support.

6. In a cutlery-glazing machine, a work-holder comprising a plurality of supports having tubular extensions, rods slidably mounted in said extensions, a yoke pivoted near the ends of said rods, means carried by the yoke for receiving and holding work to be operated on, a spring bearing against said yoke for holding it in normally tilted position relative to said rods, a stop on said yoke, and an abutment on one of said rods coöperating with said stop for limiting the upward tilting movement of said yoke.

7. In a cutlery-glazing machine, a work-holder comprising a plurality of supports having tubular extensions, rods confined in said extensions and adjustable therein, a depending yoke pivoted near its upper ends to the rods near their upper ends, a work-carrier plate on said yoke, a spring bearing against said yoke near its lower end for normally holding the yoke in spring-pressed tilted position relative to said rods, an adjustable stop on said yoke and an abutment on one of said rods coöperating with said stop for limiting the upward tilting movement of said yoke.

JOHN G. BLESSING.

In presence of—
J. W. PAGE,
M. SANDERSON.